United States Patent
Campion et al.

(10) Patent No.: US 8,621,434 B2
(45) Date of Patent: Dec. 31, 2013

(54) SYSTEM AND METHOD FOR DISTRIBUTED SOFTWARE TESTING

(75) Inventors: Sean Campion, Lenexa, KS (US); David Messinger, West Hartford, CT (US)

(73) Assignee: TopCoder, Inc., Glastonbury, CT (US)

( * ) Notice: Subject to any disclaimer, the term of this patent is extended or adjusted under 35 U.S.C. 154(b) by 1209 days.

(21) Appl. No.: 12/145,718

(22) Filed: Jun. 25, 2008

(65) Prior Publication Data
US 2009/0007074 A1 Jan. 1, 2009

Related U.S. Application Data

(60) Provisional application No. 60/946,285, filed on Jun. 26, 2007.

(51) Int. Cl.
*G06F 9/44* (2006.01)
(52) U.S. Cl.
USPC .......................... 717/124; 717/126; 717/168
(58) Field of Classification Search
USPC ........................................................ 717/124
See application file for complete search history.

(56) References Cited

U.S. PATENT DOCUMENTS

| | | | |
|---|---|---|---|
| 5,361,360 A | 11/1994 | Ishigami et al. | |
| 5,751,941 A * | 5/1998 | Hinds et al. | 714/38.14 |
| 5,799,320 A | 8/1998 | Klug | |
| 5,916,024 A * | 6/1999 | Von Kohorn | 463/40 |
| 5,995,951 A | 11/1999 | Ferguson | |
| 6,163,805 A | 12/2000 | Silva et al. | |
| 6,569,012 B2 | 5/2003 | Lydon et al. | |
| 6,824,462 B2 * | 11/2004 | Lydon et al. | 463/9 |
| 7,027,997 B1 | 4/2006 | Robinson et al. | |
| 7,082,474 B1 | 7/2006 | Hubbard | |
| 7,234,131 B1 | 6/2007 | Speyrer et al. | |
| 7,331,034 B2 | 2/2008 | Anderson | |
| 7,386,831 B2 | 6/2008 | Flanagan | |
| 7,401,031 B2 * | 7/2008 | Hughes | 705/7.13 |
| 7,702,613 B1 * | 4/2010 | Dankenbring et al. | 707/687 |
| 7,823,138 B2 * | 10/2010 | Arguelles et al. | 717/131 |
| 7,827,438 B2 * | 11/2010 | Tarta | 714/4.1 |
| 7,840,943 B2 * | 11/2010 | Volkov | 717/124 |
| 7,870,535 B2 | 1/2011 | Rippert, Jr. et al. | |
| 8,024,705 B2 * | 9/2011 | Hughes et al. | 717/124 |

(Continued)

FOREIGN PATENT DOCUMENTS

WO    WO-2005048109    5/2005

OTHER PUBLICATIONS

International Search Report and Written Opinion for PCT Application No. PCT/US2008068101 completed Feb. 6, 2009 (9 pages).

(Continued)

*Primary Examiner* — Wei Zhen
*Assistant Examiner* — Matthew Brophy
(74) *Attorney, Agent, or Firm* — Goodwin Procter LLP (57) ABSTRACT

In general, in one aspect, a method for distributed testing includes providing a testing framework for the distributed testing of software to a number of clients at least some of which have a different operating environment than other of the clients, transmitting to each testing framework a component for testing, receiving client environment data and testing results from each testing framework, storing the testing results and environment data in a database; and reporting the results of running the tests on the clients.

23 Claims, 3 Drawing Sheets

(56) References Cited

U.S. PATENT DOCUMENTS

| | | | |
|---|---|---|---|
| 8,166,458 B2 * | 4/2012 | Li et al. | 717/124 |
| 2002/0019844 A1 | 2/2002 | Kurowski et al. | |
| 2003/0009740 A1 | 1/2003 | Lan | |
| 2003/0046681 A1 | 3/2003 | Barturen et al. | |
| 2003/0115570 A1 | 6/2003 | Bisceglia | |
| 2005/0034103 A1 * | 2/2005 | Volkov | 717/124 |
| 2006/0184928 A1 * | 8/2006 | Hughes | 717/168 |
| 2007/0168970 A1 * | 7/2007 | Li et al. | 717/124 |
| 2007/0234293 A1 * | 10/2007 | Noller et al. | 717/124 |
| 2008/0115107 A1 * | 5/2008 | Arguelles et al. | 717/124 |
| 2012/0204153 A1 * | 8/2012 | Peterson et al. | 717/124 |

OTHER PUBLICATIONS www.utest.com, webpage of *About uTest* by Roy Solomon dated Nov. 2007, retrieved from archive.org on Jan. 18, 2012, (1 page).

* cited by examiner

SYSTEM AND METHOD FOR DISTRIBUTED SOFTWARE TESTING

RELATED APPLICATIONS

This application claims priority to, and the benefit of, U.S. provisional patent application Ser. No. 60/946,285, filed on Jun. 26, 2007, entitled SYSTEM AND METHOD FOR DISTRIBUTED SOFTWARE TESTING.

TECHNICAL FIELD

This invention relates to computer-based methods and systems for facilitating the distributed testing of software.

BACKGROUND INFORMATION

Modern software development practice calls for software to be tested in the manner that it will be used. It can be challenging, however, to adequately test software that is built to be reusable and run on different platforms and/or in different operating environments. For example, software components may be expected to run in many different hardware and/or software operating environments, with different types and versions of processors, chipsets, device drivers, operating systems, application servers, and so forth, including without limitation configuration differences such as languages, graphical displays, memory configurations and so on. It may be very expensive and administratively difficult to acquire and maintain a suitable variety of hardware and software test systems.

SUMMARY OF THE INVENTION

In some embodiments, a testing system leverages the diversity of operating environments that are available from a group of participating users' devices to execute and record software tests and results. Such a system is particularly suited to testing software components because the number of tests to be run on a component typically is manageable, and so a suitable framework can be provided and maintained to manage the testing. The system also may be used with assemblies and subassemblies of components, applications, plug-ins, web-based applications, mobile devices, and so on.

In some embodiments, a testing framework application is downloaded and installed by participating users onto their devices (e.g., desktops, laptops, mobile devices, telephones, etc.). The testing application obtains software for testing, and tests the software. In some embodiments, the testing framework may be configured to test the software at an appropriate time, for example, when the a device is not otherwise busy, when the device is not being used, or otherwise such that the testing would not interfere with the user's perceived performance of the device. The software is tested using the current software and hardware configuration of the device, and so by testing on different users' devices, may be tested in a variety of environments.

In some embodiments, the testing system is integrated with or used in combination with a distributed software development domain, such as that described in co-pending U.S. patent application Ser. No. 10/408,402, entitled "SYSTEM AND METHOD FOR SOFTWARE DEVELOPMENT," issued as U.S. Pat. No. 7,292,990. In such a system, a distributed community of developers develops software according to a software development methodology. In some embodiments, members of a distributed community of software developers may participate in a testing system by running a testing framework on their personal devices. The members may gain some benefit within the software development domain from allowing their devices to participate in the distributed testing environment. For example, members may gain the ability to have their software tested using the distributed testing environment. In some embodiments, the members may be required to participate in the testing system in order to realize some benefit. For example, members who participate in the testing system may receive a bonus reward, such as money, prize points, prizes, access to competitions, and so forth.

In general, in one aspect, a method for distributed testing may include providing a testing framework for the distributed testing of software to a number of clients at least some of which have a different operating environment than other clients. Again, the environment may include the software environment and/or configuration. The method may include transmitting to each testing framework client software for testing. The method may include transmitting tests to each testing framework client separate from the software for testing. The method may include receiving client environment data and testing results from each testing framework. The method may include storing the testing results and environment data in a database. The method may include reporting the results of running the tests on the clients. If enough users with different operating environments participate, the software under test may be certified on a number of different systems. In some embodiments, the method includes providing the testing framework to members of a distributed community of software developers. Each of the developers may run the software on their system.

The software for testing may be any sort of software, including without limitation an application, a component, etc. The software communicated to the client may include software under test and tests to test the software under test. Clients may be selected based on their operating environment. Again, the operating environment may include the hardware and/or software installed on the client and the configuration of such hardware/software. The client environment data may be automatically determined by the testing framework. The method may also include correlating testing results and environment data, and the results may be reported with, or correlated with, the operating environments on which they occurred. The method also may include managing by the client, the testing of a second system in communication with the testing framework.

In general, in one aspect system for distributed testing includes a client for downloading and testing software to be tested. The client includes a software and test case download subsystem for obtaining software for testing, an environment capturer for capturing information about the operating environment, a test case execution subsystem for executing tests; a metric capturer for capturing testing results, and a metric and environment information upload subsystem.

In various embodiments, the system may include multiple clients. The system may include a server in communication with the multiple clients. The server may include an environment tracking subsystem for tracking the operating environments of the clients, a metric capture subsystem for receiving testing results from the clients, and/or a component distributor for communicating the software for testing. The component distributor may distribute the software under test to clients having a variety of operating environments. Some of the variety of operating environments may be similar while some may be different. Similar ones may be used to verify whether a problem is isolated to a particular system or to an operating environment. The system may include a second system synchronization subsystem, for synchronizing the testing framework with a second system. The second system may be in communication with the second system synchronization subsystem, the second system under test by the testing framework. The system may include a management interface for allocating testing resources to a user.

In some embodiments, device administrators are rewarded for allowing the testing framework to run on their device. Rewards may be money, points, prizes, access to activities, or any other suitable reward. For example, the reward may be access to the distributed testing system. In some embodiments, participation in the testing system takes the form of a competition, in which participants who provide the most testing resources receive recognition and/or a reward. For example, a participant who completes the greatest number of tests may be recognized as the most active tester, and rewarded accordingly.

In general, in another aspect, a system for testing includes a test case execution subsystem, a metric capturer, an environment capturer, a component and test case download subsystem, and an upload subsystem for uploading test results and environment information.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
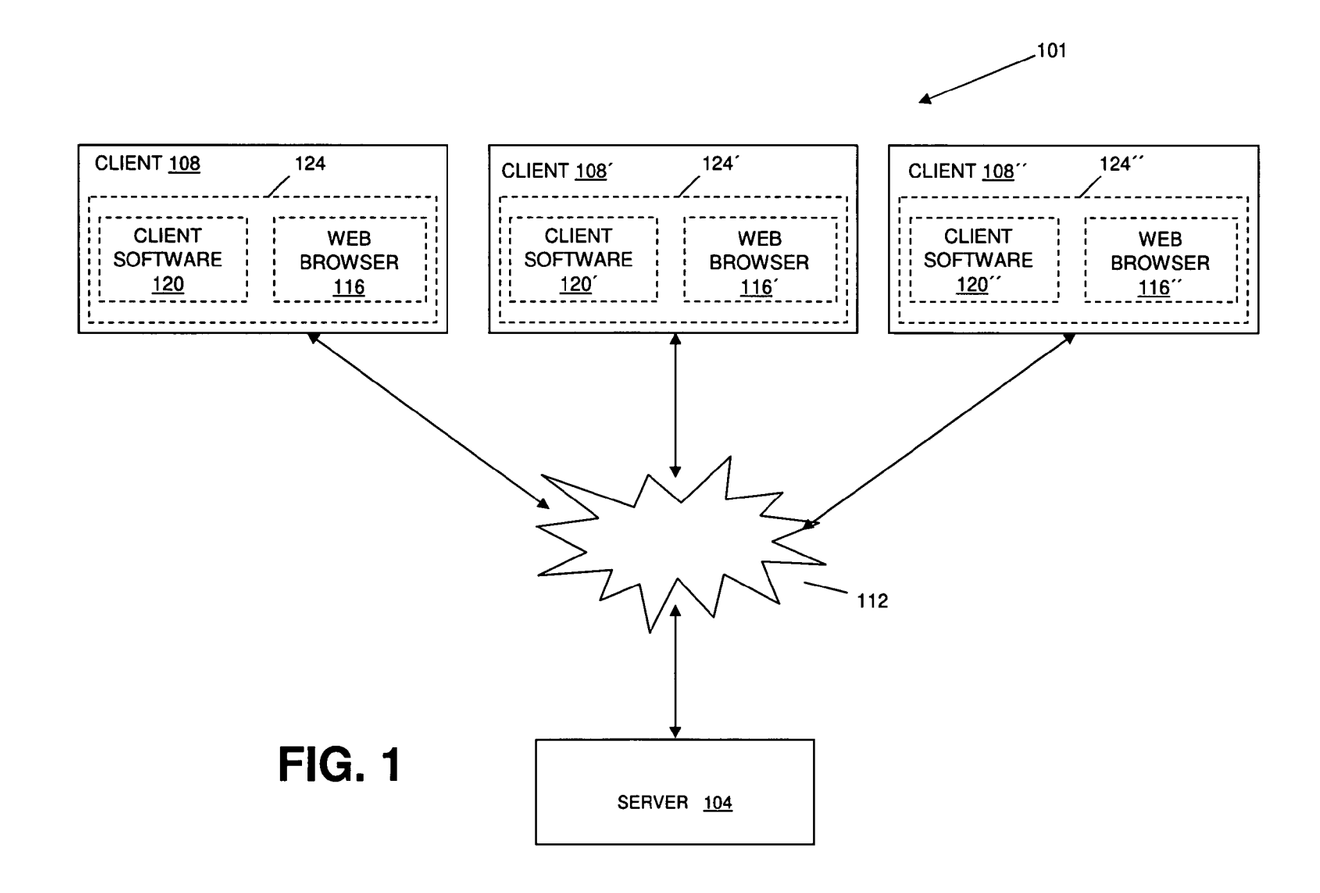
FIG. 1 is a block diagram of an embodiment of a distributed software testing system.

Referring to FIG. 1, in one embodiment, a distributed content development system 101 includes at least one server 104, and at least one client device 108, 108', 108", generally 108. As shown, the distributed content development system includes three clients 108, 108', 108", but this is exemplary and for demonstrative purposes, and it is intended that there can be any number of clients 108. The client 108 may be implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MAC OS operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 108 may also be implemented on such hardware devices as a smart or dumb terminal, network computer, set top box, game player, mobile device, wireless device, wireless telephone, personal digital assistant, media (e.g., music and/or video) player, camera, information appliance, workstation, minicomputer, mainframe computer, or any other device with computing functionality. The client 108 may be operated as a general purpose computer or a special purpose hardware device.

Generally, in various embodiments, clients 108 may be operated and used to participate in various software development activities. Examples of software development activities include but are not limited to participation in software development projects and distributed testing projects. Clients 108 may be operated by individuals who have agreed to allow their client devices 108 to participate in a system for distributed testing. Such individuals may be members of a community of software developers. Clients 108 also may be operated by entities who have requested that the software developers develop software (e.g., customers). The customers may use the clients 108 to review content developed by the content developers, post specifications for the development of software, view information about the software developers, as well as other activities described here. The clients 108 also may be operated by a facilitator, acting as an intermediary between the customers and the content developers.

In some embodiments, a client device 108 includes a web browser 116, client software 120, or both. The web browser 116 allows the client 108 to request a web page or other downloadable program, applet, or document (e.g., from the server 104) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 108 manually requests a web page from the server 104. Alternatively, in another embodiment, the client 108 automatically makes requests with the web browser 116. Examples of commercially available web browser software 116 are INTERNET EXPLORER, offered by Microsoft Corporation, NETSCAPE NAVIGATOR, offered by AOL/Time Warner, or FIREFOX offered by the Mozilla Foundation.

In some embodiments, the client 108 also includes client software 120. The client software 120 provides functionality to the client 108 that allows a device to participate in distributed testing activities. The client software 120 may be implemented in various forms, for example, it may be in the form of a Java applet or program that is downloaded to the client 108 and runs in conjunction with the web browser 116. The client software 120 also may be in the form of a standalone application, implemented in a multi-platform language such as .Net or Java, or in native processor executable code. In one embodiment, if executing on the client 108, the client software 120 opens a network connection to the server 104 over the communications network 112 and communicates via that connection to the server 104. The client software 120 and the web browser 116 may be part of a single client-server interface 124; for example, the client software can be implemented as a "plug-in" to the web browser 116 and/or code that is downloaded and run within the framework of the web browser 116.

In one embodiment, the client software 120 is software that is specifically implemented for the purpose of implementing functions described here. In another embodiment, the client software 120 includes other functionality, as well as implementing functions described here. For example, the client software 120 may be included as part of an operating system, application server, application program, and/or other software. The client software 120 may perform tests when other functions of such operating systems, application servers and/or application programs are not using the full capacity of the device. For example, an email application program may also include within it client software 120 functionality as described here, and when the email application and the operating system are not busy, the client software 120 testing functionality may be operated. Likewise, an operating system may include client software 120, such that when the device is not busy, the client software 120 testing functionality may be operated on the device. The client software may include software tools for software development and/or participation in software development competitions.

A communications network 112 connects the client 108 with the server 104. The communication may take place via any media such as standard telephone lines, LAN or WAN links (e.g., T1, T3, 56kb, X.25), broadband connections (ISDN, Frame Relay, ATM), wireless links (802.11, bluetooth, etc.), and so on, in any suitable combination. Preferably, the network 112 can carry TCP/IP protocol communications, and HTTP/HTTPS requests made by the web browser 116 and the connection between the client software 120 and the server 104 may be communicated over such TCP/IP networks. The type of network is not a limitation, however, and any suitable network may be used. Non-limiting examples of networks that can serve as or be part of the communications network 112 include a wireless or wired ethernet-based intranet, a local or wide-area network (LAN or WAN), and/or the global communications network known as the Internet, which may accommodate many different communications media and protocols.

The servers 104 interact with clients 108. The server 104 is preferably implemented on one or more server class computers that have sufficient memory, data storage, and processing power and that run a server class operating system (e.g., SUN Solaris, GNU/Linux, and the MICROSOFT WINDOWS family of operating systems). Other types of system hardware and software than that described herein may also be used, depending on the capacity of the device and the number of users and the size of the user base. For example, the server 104 may be implemented on, or may be part of, a logical group of one or more servers such as a server farm or server network. As another example, there may be multiple servers 104 that may be associated or connected with each other, or multiple servers could operate independently, but with shared data. In a further embodiment and as is typical in large-scale systems, the application software may be implemented in components and/or subgroups, with different components and/or subgroups running on different server computers, on the same server, or some combination.

In one embodiment, the server 104 and clients 108 enable the distributed testing of software by one or more devices, which devices may or may not be associated with the entity requesting the development of the software or that developed the software.

Figure 2:
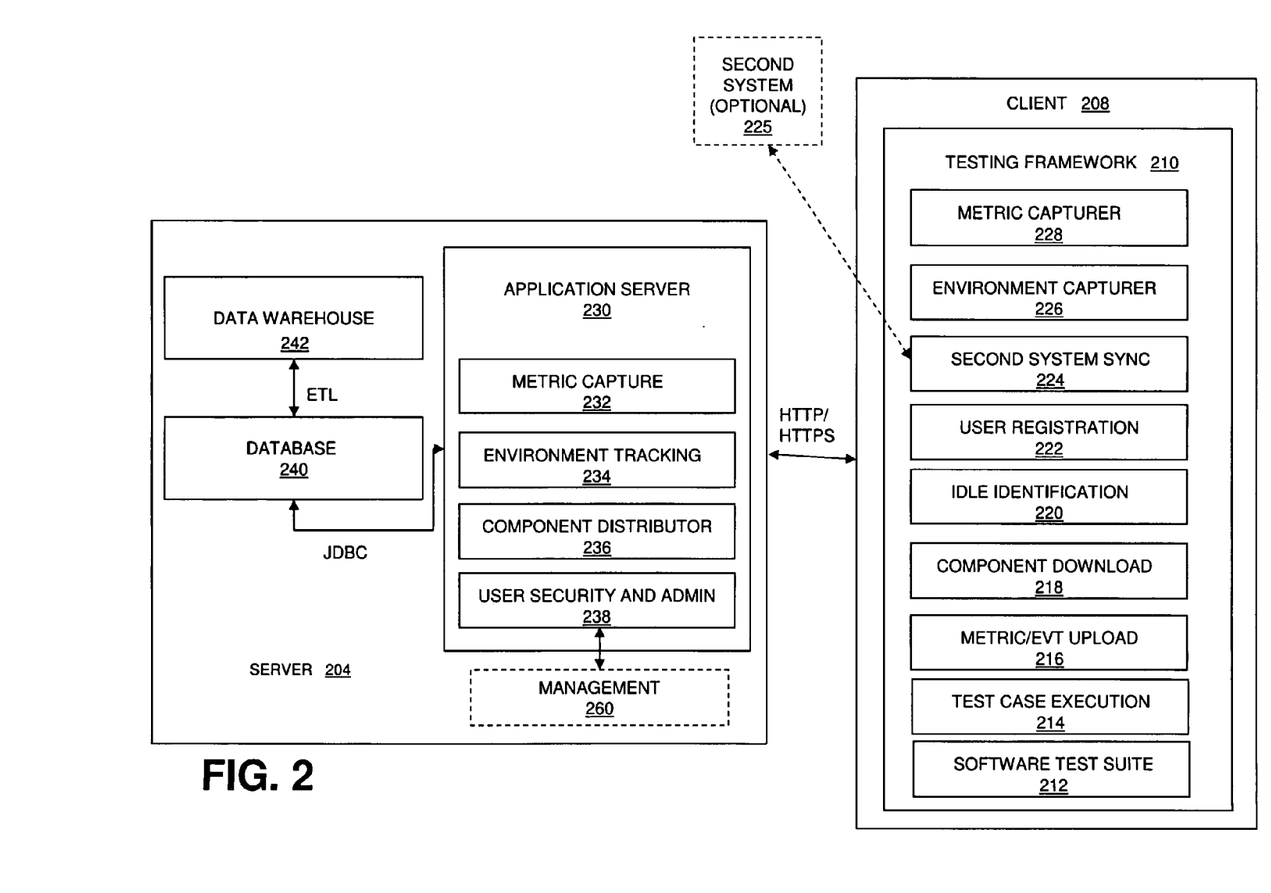
FIG. 2 is a block diagram of an embodiment of the invention.

Referring to FIG. 2, a distributed software testing system facilitates the distributed testing of software. A server 204 communicates with one or more clients 208. One exemplary client is shown in the figure, but it should be understood that their may be any number of clients 208 in a particular implementation. Preferably, there are a large number of clients 208, with some clients having the same general operating environment as others, and some clients have different operating environment. Clients 208 may be the system under test, or in communication with the system under test. Clients 208 may be a virtualized operating environment, such as that provided by virtualization servers such as VMWARE and XEN. Generally, a client 208 communicates with the server 204 to obtain software to be tested and to obtain tests to run on the software. The client 208 tests the software with a testing framework 210. The testing framework 210 may be implemented within, as a part of, and/or in communication with client software 120 (FIG. 1) such as that described above.

The testing framework 210 may run as a foreground application on the client, and/or in the background. The testing framework 210 may provide output and/or display information (e.g., progress charts, error reports) regarding the status or progress of ongoing tests. The testing framework may be configured, for example, to run tests when the client 208 is not otherwise being used, when running the test would not interfere with other tasks to be performed by the device, only when the client is plugged in (e.g., for a client that is a mobile device), or under other specified circumstances or conditions.

The tests may involve testing an entire software application and/or a portion of a software application. The testing may involve testing one component, two components, and/or any number of components. In some embodiments, components are configured with suitable testing interfaces, and one or multiple components may be tested, for example, for regression testing when a component with multiple dependencies is upgraded or replaced.

Within the testing framework 210, a client may download test suites 212 that include one or more components and one or more tests. In some embodiments, the test suites or individual tests may be associated with the components being tested, whereas in other cases the tests may be more general in nature. A test case execution subsystem 214 may test the components by running the tests in the test suites 212 on the client 208. The results collected by the test case execution subsystem 214 may include performance data, test results, as well as client environment information, such as operating system, languages, CPU, memory, library versions, character sets, time zones, and so on. Such information may be systematically collected for each component and may be used to populate a database of operating information with data for each component. Such information may be used to certify the testing of a component on specified operating environments.

In some embodiments, the test case execution subsystem 214 may need to set up and/or tear down certain software and/or configuration of the system under test. For example, if the testing requires certain other software to be available during testing, the test case execution subsystem may set up and/or tear down such software and/or configuration. After testing is completed, the test case execution subsystem may then tear down/set up such other software and/or configuration that was configured by the test case execution subsystem 214 prior to the testing. In this way, systems that have not been appropriately configured may be so configured prior to testing.

The testing framework 210 may include an upload subsystem 216 to provide the server with test results obtained by the test case execution subsystem 214 and captured by the metric capturer. The upload system 216 may provide testing and/or environment information to the server 204, for example using HTTP/HTTPS protocol. It should be understood that any suitable protocol may be used.

The testing framework 210 may include a component download subsystem 218 for requesting and receiving components and tests for the components. In some embodiments, the component download subsystem 218 may also download updates for and/or updated versions of the testing framework 210 and/or the client software 208. For example, the component download subsystem 218 may download new software test suites 212. For example, the component download subsystem 218 may download new software modules to replace software modules that comprise the testing framework 210.

The testing framework 210 may include an idle identification subsystem 220, which may be used to initiate the running of testing functionality such that the running of the testing functionality does not disrupt the operation of a user's computer. This may be performed in any suitable manner. For example, the idle identification subsystem 220 may communicate with an operating system or application server to determine current load on the client. As another example, the idle identification subsystem 220 may make its own determination of system load by analyzing the resources available to the testing framework 210, based on the behavior of the testing framework.

A user registration subsystem 222 may allow a user to provide registration and/or authentication details (e.g., username, password, and so forth) that may be communicated to the server. In some embodiments, the user registration subsystem 222 may allow registration, and creation of a new account for a user. In some embodiments, the user registration subsystem 222 may allow management of user information at the server. In some embodiments, a participant manages at least some of their information at the server using a web browser. The user may provide enough information to the user registration subsystem to allow the client 208 to authenticate appropriately to the server 204.

The second system synchronization subsystem 224 may be used for testing features that are specific to another device 225 that may be connected to or in communication with the device that is running the client software 208. For example, the second system 225 may be a mobile device (e.g., wireless PDA, cell phone, mobile telephone, and so forth), another computer, a telephone system, an HVAC system, or any other type of hardware or software platform that may be in communication with the client software 208. The second system synchronization subsystem 224 may be used to connect to the second system (e.g., the mobile device 225) for testing and/or download software to the mobile device for testing. In this way, in some embodiments, the client software serves as a gateway to other systems that are accessible to the client software for testing of software on such second systems. For example, in one embodiment, the mobile device synchronization subsystem uses the ACTIVESYNC technology available from MICROSOFT to load software onto a WINDOWS MOBILE device, for testing of on the mobile device. Software to be tested may be run on the mobile device and/or in coordination with software on the mobile device.

An environment capturer 226 may determine the characteristics of the client's environment. The environment may include different types and versions of processors, chipsets, device drivers, operating systems, application servers, applications, software, application programming interfaces, second systems and/or mobile devices and their configurations, and so forth, including without limitation configuration differences such as languages, graphical displays, memory configurations, and so on. Just as one non-limiting example, the environment capturer may record the database software that is installed on a client, if that relates to the software under test. The environment capturer 226 stores data describing the client 208 environment for communication to the server 204. Some of the environment may set up/torn down or otherwise changed, configured and/or adjusted by the test execution subsystem 214, and in such cases the environment during testing may be reported also and/or instead.

A metric capturer 228 captures testing metrics that result from execution of the software test suite 212 by the test case execution subsystems 214. The metric capturer may record any suitable metrics, for example, output data, errors encountered, testing results, test running time, and so on. The metrics captured by the metric capturer 228 may include metrics about the system and/or the environment, including without limitation the time allocated by the client 208 to testing, and the resources of the system that are used by the tests when executed by the test case execution 214 subsystem. The metric capturer 228 may also capture metrics about the operation of the testing framework 210. The metric capturer 228 may make the captured metrics available to the metric upload subsystem 216.

The server 204 may include an application server 230 that runs application subsystems 232-238 that may be in communication with a database 240. The database may be in communication with a data warehouse 242. It should be understood that the implementation shown is exemplary, and each of the application server 230, database 240, and data warehouse 242 may be implemented on the same or different servers, and portions of each of the application server 230, database 240, and data warehouse 242 may be implemented on one, two or more servers. The servers 230 may be co-located or spread apart geographically.

The application server 230 may include a metric capture subsystem 232 which may capture and parse data from the various capturers 228 on the clients 208. The metrics may be stored in the database 240.

The application server 230 may include an environment tracking subsystem 234 which may track the data from various environment capturers 226 on different clients. The data tracked by the environment tracking subsystem 234 may be used to allocate components for testing to various clients, so that components are tested in a variety of environments.

A component distributor 236 may make use of the data stored in the database 240 and/or provided by the metric capture 232 and environment tracking subsystem 234 to identify components that should be distributed to clients, such as client 208. The component distributor may determine based on its configuration how many clients 208 of a particular configuration to assign a particular software program for testing.

The user security and administration subsystem 238 allows users and/or clients to authenticate to the server 204 for access to components and communication of metric and environment information. The user security and administration subsystem may use a username/password, a cookie, an encryption key, and/or any other suitable security and/or authentication technique.

The database 240 may include information about metric data, environment data, and users as well as other suitable information. The information in the database 240 may be used by the various application subsystems 232-238 to store and retrieve data. The database 240 may also include components to be tested, and information about which components already have been tested, and on which environments.

The data warehouse subsystem 242 also may access the database 240 to extract data and report on the status of the testing. The data warehouse subsystem 242 may determine whether software has been tested, and on which environment combinations. The data warehouse subsystem may provide reports that may be used to certify the operation of software on particular operating environments.

In some embodiments, data from the metrics capture subsystem 232 may be logged or otherwise communicated automatically to an error-reporting and/or tracking application. For example, errors may be automatically communicated to a JIRA bug and issue tracking system, available from ATLASSIAN PTY LTD of Sydney, Australia. It may be possible to investigate and prioritize errors for correction.

In some embodiments, data from the metrics capture system 232 is correlated prior to logging and/or reporting. For example, it may be possible to determine that a particular error has been found only in certain operating environments. In some embodiments, the errors are logged and/or reported along with information about the operating environments for which the errors occurred. It can be very helpful, for example, to determine that an error occurs under Windows XP with a particular version of an application server, but not with later versions.

In some embodiments, the data is automatically communicated to an issue tracking system in a manner in which the information may be used to run a competition to fix the identified problem. For example, in some embodiments, competitions are held to fix errors that are identified during distributed testing. A prize is associated with identifying and/or resolving the issue, and the first contestant to correctly submit the patch wins the prize. Reports from the distributed testing system may be used as the basis for these competitions. In some embodiments, the competitions are started automatically, when the issues are communicated to the error tracking software. The prize is started a certain minimum level, so that contestants have the opportunity to fix the bug right away. The prize may be subsequently increased, either when the bug has not been fixed, or when a administrator has an opportunity to review the bug and set an appropriate prize.

In some embodiments, contestants may submit their proposed changes for testing on the platforms on which the bug was reported, to see if their change fixes the problem.

In some embodiments, software may tested on a number of client systems with similar configuration to validate consistency of operation. For example, software may be tested on two, three, or more different clients each having essentially the same environment, so as to make sure that the operation is consistent.

In some embodiments, test monitoring and scheduling is handled through a management application 260. In some embodiments, the management application is a web-based administration interface that allows an administrator to configure the system to deploy a component test suite for testing. The administrator may identify a component for testing, identify the environments desired for testing, the number of systems in different environments, the set(s) and/or subset(s) of tests to be used, and so forth. In some embodiments, the environments may be specified by a range of available options.

In some embodiments, the client 208 and server 204 is used within a large organization to manage and distribute component tests on the many machines available to members of the organization. For example, a software company can use such a platform to test its software at night on all of the machines owned by the company.

In some embodiments, a variety of operating environments are deployed in virtualization packages such that they can be uploaded to a computer running virtualization software, such as VMWARE or XEN. The virtualization packages also include the testing framework 210. In this way a desired operating environment can selected, loaded and run on a system running a virtualization server, and testing run in that operating environment. This has the advantage of allowing for testing of desired operating environments that might not be otherwise available, but has the disadvantage of not running on actual user systems. In some embodiments, the use of virtualized operating environments can increase the variety of operating environments.

In some embodiments, if an issue is identified at a client, further testing is conducted in the virtualized operating environment most similar to the client that reported the issue, to see if the issue can be reproduced. The component distributor can signal that a virtualized system with certain parameters is needed. For example, after receiving a report of an issue on a client system with Windows XP Service pack 2, running JBOSS 4.0.0 application server and configured for the Chinese language, a virtualized system with that software and configuration, and the testing framework, is loaded onto a computer running a virtualization server. The same tests are run on that virtualized system to see if the issue can be reproduced. If the issue can not be reproduced, the issue may be due to other differences in the operating environment, which may be further investigated.

Figure 3:
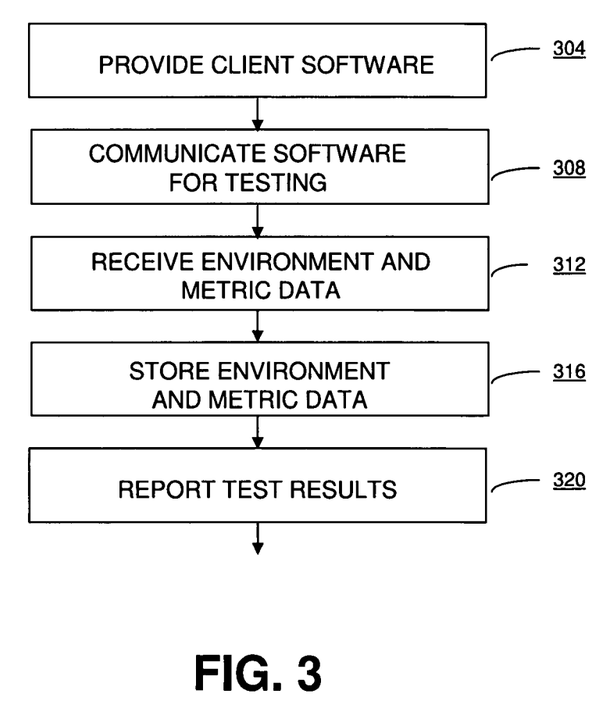
FIG. 3 is a flowchart of an embodiment of the invention.

Referring to FIG. 3, in some embodiments, a method for distributed testing includes providing client software STEP 304. The client software may include functionality for the distributed testing of software. The client software may be, for example, the testing framework described with respect to FIG. 2. In some embodiments, the client software 304 includes a metric capturer, an environment capturer, a component and test case download subsystem, a data upload subsystem, a test case execution subsystem, and other functionality.

The method also may include transmitting software for testing to the provided client software (e.g., one or more software components) for testing STEP 308. The testing may include one or more test cases. The tests (e.g., test cases, test suites, test data) may also be transmitted. The software and/or tests may be transmitted by making them available for download via a web server and/or via any suitable protocol.

The method also may include receiving environment and metric data from the provided client software STEP 312. The environment data may include information about the operating environment in which the client software is running. The environment data may include information about versions of hardware, software, operating systems, application severs, and so on as well as configuration information, including without limitation language, memory, display, and so forth. The environment and metric data may be received by upload via a web server and/or by any other suitable protocol.

The method also may include storing the environment and metric data STEP 316. The environment and test data may be stored such that it may be associated with the software that was tested and/or the client and/or the client environment. In some embodiments, the environment and metric data is stored in a relational database.

The method also may include reporting the test results STEP 320. The test results may be reported electronically, for example, on a video display. The test results may include an aggregation of the testing performed on the various client systems using the provided client software. The test results may include output, data, text, screen displays, results, and so on.

In some embodiments, the method includes configuring, for example by an administrator, a test management system to provide particular software and associated tests to client software. The particular software and/or associated tests may be identified. Individual clients and/or groups of clients and/or configurations of clients and/or environments of clients may be specified for testing.

Although described here with reference to certain types of software and testing, it should be understood that the system described may be used with any suitable software and any suitable tests. Likewise, combinations and variations of what is described here may be implemented.

In some embodiments, users associated with clients are rewarded for allowing their computers to run the client software and the tests. Users may be rewarded with prizes, money, goods, services, system access, contest access, and so forth. In some embodiments, the reward is based on the amount of test case execution allowed. In some embodiments, users of a system are requested to provide a certain amount of testing in order to participate in certain activities. For example, participants may be rewarded by access to an on-line service. Participants may be rewarded by access to on-line or off-line content (e.g., video, music, multimedia, games, contests).

In some embodiments, the testing software is integrated with a content player, such that the testing occurs while the content player is active. In some embodiments, the testing occurs when the content player (and the device) is not active, for example, while the owner of the device is sleeping, and participants are rewarded for allowing access to their device by gaining access (or credits toward access) to the content.

In some embodiments, the users are members of a distributed community of developers. In some embodiments, the developers cooperate with each other to test each other's software. Points are used to track each developer's cooperation. In some embodiments, a developer who allows his computer to test software developed by others is entitled to test the developer's own software on other's computers. In some embodiments, a cooperative system is used to allocate resources, such that a person who donates time on his machine for testing is allowed to access the same amount of time on other machines.

In some embodiments, an payment process is used instead or in addition to allocate access to the system. A customer provides the software and tests to the system and a description of the desired test environment(s). If the system is available, a standard, or minimum price is paid for access. If the system is full, a higher amount may be paid to for faster service. In some cases, an auction process is used to allocate testing resources. For example, customers may bid for a time period (e.g., 15 minutes, 1 hour) of access to 100 testing frameworks of assorted operating environments. In some embodiment, the bidding takes place up to 10 minutes prior to the start of the time period, and the highest bidder has the testing resources allocated.

In some embodiments, the test execution environment is configured (at least in part) to prevent (or make more difficult) the execution of malicious code. For example, certain types of access to the client device may be restricted. The security features included in the testing framework may strike a balance between the need for security and the need to test the code in a realistic testing environment.

In some embodiments, the software to be tested is reviewed in a rigorous development review process intended, at least in part, to prevent the inclusion of malicious code. In some embodiments, the source code for the software under test is available to a user of the client software to enable a review of the code for malicious code.

What is claimed is:

1. A computer-implemented method for distributed testing, the computer comprising a processor programmed to perform the steps of:
    facilitating registration of one or more users as potential participants in a distributed software testing environment;
    providing, to the registered participants for download, a testing framework for the distributed testing of software on clients associated with the participants, at least some of which clients have a different operating environment than other of the clients;
    subsequent to the downloading and installation of the testing framework on at least one of the clients, transmitting to each installed testing framework software for testing on the client on which the framework is installed;
    receiving client environment data and testing results from each testing framework, wherein the client environment data comprises a hardware configuration and a software configuration of each of the clients;
    aggregating the testing results and environment data in a database;
    reporting the results of running the tests; and
    rewarding at least one of the registered participants based on the amount of testing executed on the client associated with the participant.

2. The method of claim 1, wherein the software for testing comprises a component.

3. The method of claim 1, wherein the software for testing comprises the software under test and tests to test the software under test.

4. The method of claim 1, wherein the clients are selected based on their operating environment.

5. The method of claim 4, wherein the operating environment comprises the software installed on the clients and the configuration of the software installed on the clients.

6. The method of claim 1, wherein the client environment data is automatically determined by the testing framework.

7. The method of claim 1, further comprising correlating testing results and environment data.

8. The method of claim 7, wherein the results are reported with the operating environments on which they occurred.

9. The method of claim 1, further comprising managing by the clients, the testing of a second system in communication with the testing framework.

10. A system for distributed testing, comprising:
    a client for downloading and testing software to be tested, the client having a processor and a memory operatively coupled to the processor and comprising:
    a user registration subsystem for facilitating registration of one or more users associated with the client as potential participants in a distributed software testing environment;
    a software and test case download subsystem for:
    downloading and installing a testing framework for the distributed testing of software on the client, and
    subsequent to the downloading and installation of the testing framework, obtaining software via the testing framework for testing, on the client;
    an environment capturer for capturing information about the operating environment, wherein the information comprises a hardware configuration and a software configuration of the client;
    a test case execution subsystem for executing tests;
    a metric capturer for capturing testing results; and
    a metric and environment information upload subsystem; and
    a server in communication with the client, wherein the server comprises a reward subsystem for rewarding at least one of the registered participants based on the amount of testing executed on the client associated with the participant.

11. The system of claim 10, further comprising multiple clients, wherein the server is in communication with the multiple clients.

12. The system of claim 10, wherein the server further comprises an environment tracking subsystem for tracking the operating environments of the clients.

13. The system of claim 10, wherein the server further comprises a metric capture subsystem for receiving testing results from the clients.

14. The system of claim 10, wherein the server further comprises a component distributor for communicating the software for testing.

15. The system of claim 14, wherein the component distributor distributes the software under test to clients with a variety of operating environments.

16. The system of claim 15, wherein some of the variety of operating environments are similar and some are different.

17. The system of claim 10, further comprising a second system synchronization subsystem, for synchronizing the testing framework with a second system.

18. The system of claim 17, further comprising a second system in communication with the second system synchronization subsystem, the second system under test by the testing framework.

19. The system of claim 10, further comprising a management interface for allocating testing resources to a user.

20. The method of claim 1, wherein at least one of the clients has a virtualized operating environment.

21. The method of claim 1, further comprising retesting the software in a virtualized operating environment representing an environment substantially similar to the client environment of one of the clients.

22. The system of claim 10, wherein the operating environment is a virtualized operating environment.

23. The system of claim 14, wherein the component distributor distributes the software under test to a client having a virtualized operating environment representing an environment substantially similar to the operating environment of one of the other clients.

* * * * *